US009740867B2

(12) United States Patent
Nelson et al.

(10) Patent No.: US 9,740,867 B2
(45) Date of Patent: Aug. 22, 2017

(54) SECURELY PASSING USER AUTHENTICATION DATA BETWEEN A PRE-BOOT AUTHENTICATION ENVIRONMENT AND AN OPERATING SYSTEM

(71) Applicant: Dell Products, L.P., Round Rock, TX (US)

(72) Inventors: Amy Christine Nelson, Round Rock, TX (US); Christohper D. Burchett, Lewisville, TX (US)

(73) Assignee: Dell Products, L.P., Round Rock, TX (US)

( * ) Notice: Subject to any disclaimer, the term of this patent is extended or adjusted under 35 U.S.C. 154(b) by 11 days.

(21) Appl. No.: 14/942,840

(22) Filed: Nov. 16, 2015

(65) Prior Publication Data

US 2017/0140151 A1    May 18, 2017

(51) Int. Cl.
| | | |
|---|---|---|
| *G06F 21/57* | (2013.01) | |
| *G06F 9/44* | (2006.01) | |
| *G06F 1/26* | (2006.01) | |
| *H04L 9/08* | (2006.01) | |
| *H04L 9/32* | (2006.01) | |

(52) U.S. Cl.
CPC .............. *G06F 21/575* (2013.01); *G06F 1/26* (2013.01); *G06F 9/4403* (2013.01); *H04L 9/0897* (2013.01); *H04L 9/3234* (2013.01); *G06F 2221/034* (2013.01)

(58) Field of Classification Search
CPC .................................................. G06F 21/575
See application file for complete search history.

(56) References Cited

U.S. PATENT DOCUMENTS

| | | | | |
|---|---|---|---|---|
| 2005/0111664 | A1* | 5/2005 | Ritz ...................... | G06F 21/575 380/255 |
| 2005/0141717 | A1* | 6/2005 | Cromer ................. | G06F 21/575 380/277 |
| 2008/0083019 | A1* | 4/2008 | Wang ..................... | G06F 21/575 726/5 |
| 2009/0165097 | A1* | 6/2009 | Cherian ................. | G06F 21/41 726/5 |
| 2009/0319806 | A1* | 12/2009 | Smith .................... | G06F 21/575 713/193 |

(Continued)

*Primary Examiner* — Thomas Lee
*Assistant Examiner* — Gary Collins
(74) *Attorney, Agent, or Firm* — Fogarty LLP

(57) ABSTRACT

Systems and methods for securely passing user authentication data between a Pre-Boot Authentication (PBA) environment and an Operating System (OS) are described. In some embodiments, an Information Handling System (IHS) may include a processor; and a Basic I/O System (BIOS) coupled to the processor, the BIOS having program instructions stored thereon that, upon execution by the processor, cause the computer system to: identify an encrypted Single-Sign-On (SSO) token and a Trusted Platform Module (TPM) key pair provisioned by an Operating System (OS) and stored in an OS registry; extract a TPM public key from the TPM key pair; encrypt a PBA private key generated by a PBA application with the TPM public key; and store the encrypted PBA private key, the TPM key pair, and the encrypted SSO token in a shadow partition of a self-encrypting hard drive coupled to the IHS.

7 Claims, 2 Drawing Sheets

(56) References Cited

U.S. PATENT DOCUMENTS

| | | | |
|---|---|---|---|
| 2010/0202617 A1* | 8/2010 | Balakrishnan | G06F 21/575 380/277 |
| 2011/0138166 A1* | 6/2011 | Peszek | G06F 21/575 713/2 |
| 2012/0151223 A1* | 6/2012 | Conde Marques | G06F 21/6218 713/193 |
| 2012/0254602 A1* | 10/2012 | Bhansali | G06F 21/575 713/2 |
| 2013/0055365 A1* | 2/2013 | Sturges | G06F 21/33 726/6 |
| 2013/0159690 A1* | 6/2013 | Tsukamoto | G06F 1/26 713/2 |
| 2014/0281575 A1* | 9/2014 | Springfield | G06F 21/72 713/189 |
| 2015/0356299 A1* | 12/2015 | Barkelew | G06F 21/575 713/2 |
| 2016/0063259 A1* | 3/2016 | Bhansali | G06F 21/575 713/2 |

\* cited by examiner

SECURELY PASSING USER AUTHENTICATION DATA BETWEEN A PRE-BOOT AUTHENTICATION ENVIRONMENT AND AN OPERATING SYSTEM

FIELD

This disclosure relates generally to computer systems, and more specifically, to systems and methods for securely passing user authentication data between a Pre-Boot Authentication (PBA) environment and an Operating System (OS).

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In some cases, certain IHSs may include one or more self-encrypting drives, such as self-encrypting Hard Disk Drives (HDDs) or Solid State Drives (SSDs). Generally speaking, a self-encrypting drive includes a circuit built into the disk drive controller chip that encrypts and decrypts data to and from the drive's storage media automatically. In most applications, a self-encrypting drives encrypts/decrypts all the time, but the process is mostly transparent to users.

The encryption key used in self-encrypting drives is the Media Encryption Key (MEK). Locking and unlocking the drive, however, requires yet another key, called the Key Encryption Key (KEK), which is also used to encrypt or decrypt the MEK. If a KEK is set, the drive will power up locked until the correct KEK is given to the drive by the user.

When a locked self-encrypting drive is powered up, the IHS first sees a "shadow disk" that is much smaller than the real disk. The software in the shadow disk is read-only, and requires the KEK from the user to unlock the underlying disk and to decrypt the MEK. The shadow disk software stores a cryptographic hash of the KEK so it can recognize if the user gives the right KEK. When the user enters the KEK the shadow disk creates a hash of that passcode and compares it with the stored hash of the KEK. If the two match, the MEK is decrypted and put into the encryption/decryption circuit inside the drive. The IHS is called to start from the disk again, but now with the disk's full capacity, and the OS boots as usual.

SUMMARY

Embodiments of systems and methods for securely passing user authentication data between a Pre-Boot Authentication (PBA) environment and an Operating System (OS) are described herein. In an illustrative, non-limiting embodiment, an Information Handling System (IHS) may include a processor; and a Basic I/O System (BIOS) coupled to the processor, the BIOS having program instructions stored thereon that, upon execution by the processor, cause the computer system to: identify an encrypted Single-Sign-On (SSO) token and a Trusted Platform Module (TPM) key pair provisioned by an Operating System (OS) and stored in an OS registry; extract a TPM public key from the TPM key pair; encrypt a pre-boot authentication (PBA) private key generated by a PBA application with the TPM public key; and store the encrypted PBA private key, the TPM key pair, and the encrypted SSO token in a shadow partition of a self-encrypting hard drive coupled to the IHS.

In some embodiments, the OS may be MICROSOFT WINDOWS, and the encrypted SSO token and TPM key pair may be provisioned as part of a PASSPORT feature. The program instructions may cause a redirecting of commands issued by the OS and targeting the OS registry to the PBA application. The program instructions may also cause a power cycle of the IHS. The power cycle may stop electrical power from being provided to the self-encrypting hard drive.

The program instructions may cause the IHS to request that a user enter credentials into a logon application. For example, the credentials may be the same as would be entered by the user to log onto the OS. The program instructions may cause the IHS to retrieve the PBA private key, the TPM key pair, and the encrypted SSO token from the shadow partition using the credentials. The program instructions may further cause the IHS to use the TPM public key from the TPM key pair to decrypt the encrypted PBA private key, to use the decrypted PBA private key to decrypt the encrypted SSO token, and to use the decrypted SSO token to unlock the self-encrypting hard drive. The program instructions may also cause the IHS to provide the decrypted SSO token in response to an OS inquiry into the OS registry, and use the decrypted SSO token to log into the OS.

In another illustrative, non-limiting embodiment, a memory device may have program instructions stored thereon that, upon execution by a processor of an Information Handling System (IHS), cause the IHS system to: identify an encrypted Single-Sign-On (SSO) token and a Trusted Platform Module (TPM) key pair provisioned by an Operating System (OS) and stored in an OS registry; extract a TPM public key from the TPM key pair; encrypt a pre-boot authentication (PBA) private key generated by a PBA application with the TPM public key; and store the encrypted PBA private key, the TPM key pair, and the encrypted SSO token in a shadow partition of a self-encrypting hard drive.

The program instructions, upon execution, may cause the IHS to: stop electrical power from being provided to the self-encrypting hard drive; request that a user enter credentials into a logon application; and retrieve the PBA private key, the TPM key pair, and the encrypted SSO token from the shadow partition using the credentials. Again, the credentials may be the same as would be entered by the user to log onto the OS.

The program instructions, upon execution, may also cause the IHS to: use the TPM public key from the TPM key pair to decrypt the encrypted PBA private key; use the decrypted PBA private key to decrypt the SSO token; and use the decrypted SSO token to unlock the self-encrypting hard drive. The IHS may also provide the decrypted SSO token in response to an OS inquiry into the OS registry, and use the decrypted SSO token to log into the OS.

In yet another illustrative, non-limiting embodiment, a method may include identifying an encrypted Single-Sign-On (SSO) token and a Trusted Platform Module (TPM) key pair provisioned by an Operating System (OS) and stored in an OS registry; extracting a TPM public key from the TPM key pair; encrypting a pre-boot authentication (PBA) private key generated by a PBA application with the TPM public key; and storing the encrypted PBA private key, the TPM key pair, and the encrypted SSO token in a shadow partition of a self-encrypting hard drive.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
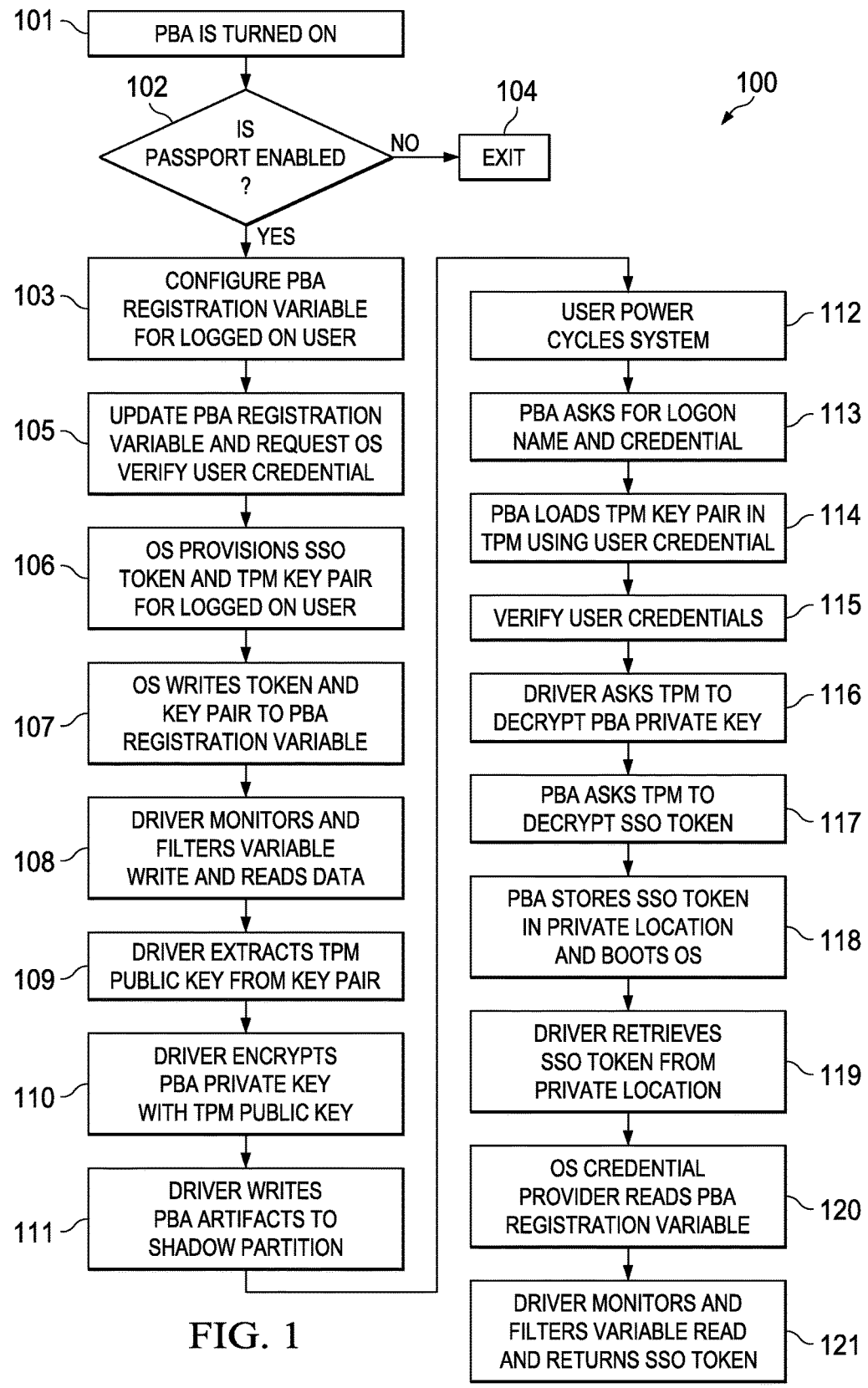
FIG. 1 is a flowchart of an example of a method for securely passing user authentication data between a Pre-Boot Authentication (PBA) environment and an Operating System (OS) according to some embodiments.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Users of IHSs equipped with devices having their hardware encryption, such as self-encrypting drives or the like, must first log into a pre-boot environment to unlock the encrypted boot disk and then, as a subsequent and entirely distinct process, they must also sign into their Operating System (OS), domain, and/or web applications—that is, the user must enter his or her credentials at least twice; first to unlock the boot disk and then to enter the OS. Examples of OSs include, but are not limited to, the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, and the like.

To date, pre-boot solutions for OS password authentication have been susceptible to "man-in-the-middle" and "pass-the-hash" attacks. Moreover, as more and more applications begin to rely on no-password based authentication methods (e.g., biometrics), the inventors hereof have determined that there should be a way to securely integrate a Pre-Boot Authentication (PBA) environment taking into account these new authentication paradigms without raising security concerns.

To address these, and other problems, systems and methods for securely passing user authentication data between a PBA environment and an OS are described below. In various embodiments, these systems and methods may be used, among other things, to: exchange public keys between a PBA environment and an OS credential manager (CM), provision a one-time token for single-sign-on (SSO), protect the one-time token using Trusted Platform Module (TPM) and the pre-boot public key during provisioning, and/or exchange the one-time token using the OS CM public key during boot for SSO.

Figure 2:
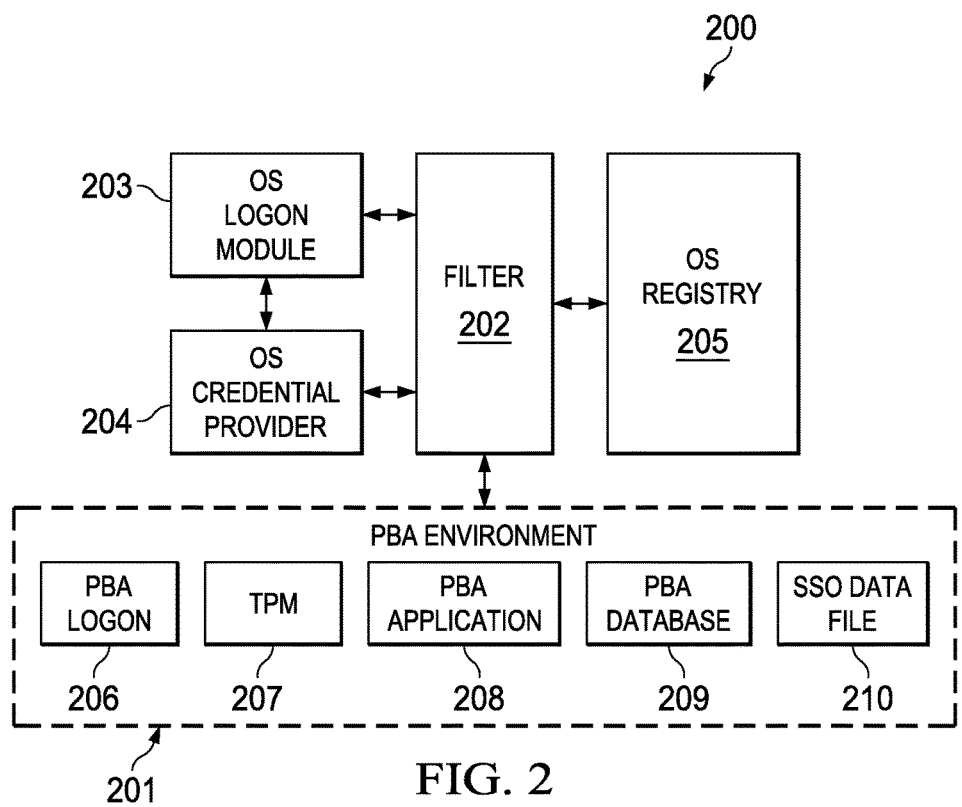
FIG. 2 is a block diagram of an example of a system for securely passing user authentication data between a PBA environment and an OS according to some embodiments.

FIG. 1 is a flowchart of method 100 for securely passing user authentication data between a PBA environment and an OS according, and FIG. 2 is a block diagram of system 200 for performing method 100. In various embodiments, method 100 may be performed, at least in part, by a BIOS or BIOS extension program within an IHS. At block 101, PBA environment 201 is turned on, generally by a user—that is, method 100 is invoked to manage access to one or more self-encrypting drives in an IHS.

Again, PBA environment 201 serves as an extension of the BIOS or boot firmware and guarantees a secure, tamper-proof environment external to the OS as a trusted authentication layer. As illustrated, it includes PBA logon module 206, Trusted Platform Module (TPM) 207, PBA application 208, PBA database 209, and SSO data file 210; explained in more detail below. Such an environment prevents anything from being read from the hard disk, such as the OS, until the user has confirmed that they have the correct password or other credentials.

In the example of method 100, the OS at issue may be MICROSOFT WINDOWS, which includes a PASSPORT feature implemented at least in part by OS Logon Module 203 and OS Credential Provider 204. Passport lets users authenticate to accounts or services that support Fast ID Online (FIDO) authentication. After an initial two-step verification during enrollment, a PASSPORT is set up on the user's IHS and the user sets a gesture, which can also be a PIN. The user provides the gesture to verify identity; WINDOWS then uses PASSPORT to authenticate users and help them to access protected resources and services.

At block 102, method 100 determines if PASSPORT is enabled. If not, method ends at block 104. Otherwise, PBA logon 206 at block 103 configures a PBA registration variable for a logged on user within OS registry 205—that is, the variable records in registry 205 the fact that PBA is being tuned on for the user that is currently logged in. At block 105, method 100 updates the PBA registration variable and requests that the OS verify the user's credential, for example, using an existing Application User Interface (API). As part of that verification, the OS examines the PBA registration variable and determines that PBA environment 201 is being turned on.

At block 106, the OS generates and provisions a Single-Sign-On (SSO) token and Trusted Platform Module (TPM) key pair for the logged on user. The TPM key pair includes a public TPM key and a private TMP key obtained, for example, from TPM module 207. The SSO token may be obtained from, or stored within, SSO data file 210. Then, at block 107, the OS writes the SSO token and the TPM key pair to the PBA registration variable in registry 205.

At block 108, filter 202 monitors and filters all data written into and read from the PBA registration variable by the OS in OS registry 205. (PBA monitor 201 and filter 202 are collectively referred to in FIG. 1 as "driver.") That is, write commands issued by the OS to the PBA registration variable in registry 205 are effectively redirected to PBA application 208 by filter 202 in a manner invisible to the OS. Similarly, read commands issued by the OS to the PBA registration variable are also redirected to PBA application 208; the OS behaves as if it were reading registry 205, but instead the data provided in response to the read command is originated by PBA application 208.

At block 109, the driver extracts the TPM public key from a TPM registration variable, and at block 110 it encrypts an existing PBA private key, which is generated by PBA logon 206 before block 101, with the TPM public key. The encrypted PBA private key, the TPM key pair, and the SSO token are collectively referred to as "PBA artifacts." At block 111, the driver writes the PBA artifacts to a shadow partition of a self-encrypting hard drive. In various implementations, the PBA database 209 and SSO data file 210 may be stored in the shadow partition.

At block 112, the user performs an IHS power cycle, for example as instructed by on-screen directions, to at least temporarily completely stop all electrical power from being provided to the self-encrypting drive. At block 113, the power comes back on and PBA logon 206 starts an authentication routine by asking the user to provide a username and credential(s) (e.g., PIN, biometrics, etc.) and verifying it at block 115. In various implementations, the credential provided by the user is the same that would be also used to log onto the OS. At block 114, PBA logon 206 retrieves the PBA artifacts previously stored at block 111 from the shadow partition, and loads the TPM key pair from TPM 207 using the user's credential.

At block 116, PBA application 208 asks the TPM to decrypt the PBA private key, which was previously encrypted at block 110. The decrypted PBA private key can be used to decrypt the SSO token at block 117, which can then be used to unlock the self-encrypting drive.

At block 118, PBA application 208 stores the SSO token in a private location and boots the OS. At block 119, the PBA application 208 retrieves the SSO token from the private location in response to an OS inquiry into registry 205. At block 120, OS Credential Provider 204 reads the PBA registration variable as filtered via filter 202. At block 121, PBA application 208 monitors and filters variable reads issued by the OS and returns the SSO token, at which point the user logs onto the OS.

In some embodiments, method 100 and system 200 allow a user to logon to an OS with the same credential that is also used to unlock a self-encrypting drive, in a single step (from the user's perspective). And because sensitive information (e.g., SSO token) is stored in a private and protected location by PBA module 201, as opposed to being stored in a PBA variable within registry 205, with intelligent filtering of write and read requests by the OS provided via filter 202, method 100 makes the authentication process much less susceptible to "man-in-the-middle" and "pass-the-hash" attacks.

Figure 3:
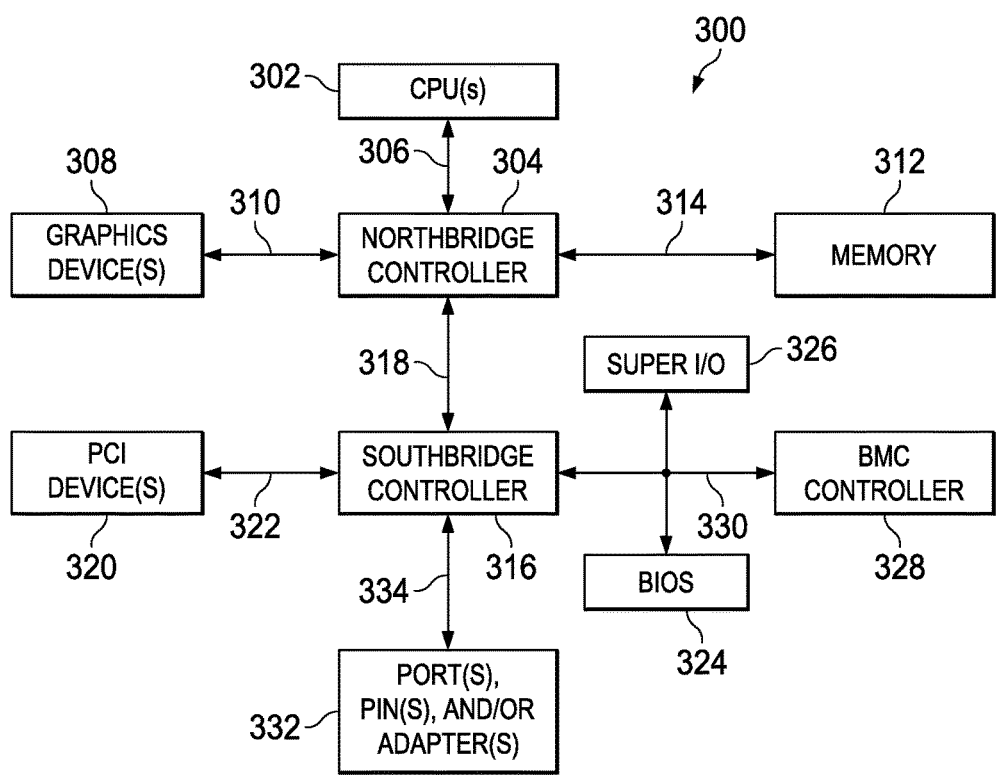
FIG. 3 is a block diagram of an example of an Information Handling System (IHS) configured to implement the systems and methods described herein according to some embodiments.

FIG. 3 is a block diagram an example of IHS 300 which may be used to implement a system for securely passing user authentication data between a PBA environment and an OS. As shown, computing device 300 includes one or more CPUs 302. In various embodiments, computing device 300 may be a single-processor system including one CPU 302, or a multi-processor system including two or more CPUs 302 (e.g., two, four, eight, or any other suitable number). CPU(s) 302 may include any processor capable of executing program instructions. For example, in various embodiments, CPU(s) 302 may be general-purpose or embedded processors implementing any of a variety of instruction set architectures (ISAs), such as the x86, POWERPC, ARM, SPARC, or MIPS ISAs, or any other suitable ISA. In multi-processor systems, each of CPU(s) 302 may commonly, but not necessarily, implement the same ISA. In an embodiment, a motherboard (not shown) may be configured to provide structural support, power, and electrical connectivity between the various components illustrated in FIG. 3.

CPU(s) 302 are coupled to northbridge controller or chipset 304 via front-side bus 306. Northbridge controller 304 may be configured to coordinate I/O traffic between CPU(s) 302 and other components. For example, in this particular implementation, northbridge controller 304 is coupled to graphics device(s) 308 (e.g., one or more video cards or adaptors, etc.) via graphics bus 310 (e.g., an Accelerated Graphics Port or AGP bus, a Peripheral Component Interconnect or PCI bus, etc.). Northbridge controller 304 is also coupled to system memory 312 via memory bus 314. Memory 312 may be configured to store program instructions and/or data accessible by CPU(s) 302. In various embodiments, memory 312 may be implemented using any suitable memory technology, such as static RAM (SRAM), synchronous dynamic RAM (SDRAM), nonvolatile/Flash-type memory, or any other type of memory.

Northbridge controller 304 is coupled to southbridge controller or chipset 316 via internal bus 318. Generally, southbridge controller 316 may be configured to handle various of computing device 300's I/O operations, and it may provide interfaces such as, for instance, Universal Serial Bus (USB), audio, serial, parallel, Ethernet, etc., via port(s), pin(s), and/or adapter(s) 332 over bus 334. For example, southbridge controller 316 may be configured to allow data to be exchanged between computing device 300 and other devices, such as other IHSs attached to a network. In various embodiments, southbridge controller 316 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 316 may also enable connection to one or more keyboards, keypads, touch screens, scanning devices, voice or optical recognition devices, or any other devices suitable for entering or retrieving data. Multiple I/O devices may be present in computing device 300. In some embodiments, I/O devices may be separate from computing device 300 and may interact with computing device 300 through a wired or wireless connection. As shown, southbridge controller 316 is further coupled to one or more PCI devices 320 (e.g., modems, network cards, sound cards, video cards, etc.) via PCI bus 322, including, for example, self-encrypting Hard Disk Drives (HDDs) or Solid State Drives (SSDs). Southbridge controller 316 is also coupled to Basic I/O System (BIOS) 324, Super I/O Controller 326, and Baseboard Management Controller (BMC) 328 via Low Pin Count (LPC) bus 330.

BIOS 324 includes non-volatile memory having program instructions stored thereon. Those instructions may be usable CPU(s) 302 to initialize and test other hardware components and/or to load an Operating System (OS) onto computing device 300. As such, BIOS 324 may include a firmware interface that allows CPU(s) 302 to load and execute certain firmware, as described in more detail below. In some cases, such firmware may include program code that is compatible with the Unified Extensible Firmware Interface (UEFI) specification, although other types of firmware may be used.

BMC controller 328 may include non-volatile memory having program instructions stored thereon that are usable by CPU(s) 302 to enable remote management of computing device 300. For example, BMC controller 328 may enable a user to discover, configure, and manage BMC controller 328, setup configuration options, resolve and administer hardware or software problems, etc. Additionally or alternatively, BMC controller 328 may include one or more firmware volumes, each volume having one or more firmware files used by the BIOS' firmware interface to initialize and test components of computing device 300.

As a non-limiting example of BMC 328, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of operating system or hypervisor presence because from a pre-OS or bare-metal state, iDRAC is ready to work because it is embedded within each server from the factory.

Super I/O Controller 326 combines interfaces for a variety of lower bandwidth or low data rate devices. Those devices may include, for example, floppy disks, parallel ports, keyboard and mouse, temperature sensor and fan speed monitoring, etc.

In some cases, computing device 300 may be configured to access different types of computer-accessible media separate from memory 312. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to computing device 300 via northbridge controller 304 and/or southbridge controller 316.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that computing device 300 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 304 may be combined with southbridge controller 316, and/or be at least partially incorporated into CPU(s) 302. In other implementations, one or more of the devices or components shown in FIG. 3 may be absent, or one or more other components may be added. Accordingly, systems and methods described herein may be implemented or executed with other computer system configurations.

One of ordinary skill will recognize that the computer system 300 of FIG. 3 is only one example of a system in which the present embodiments may be utilized. Indeed, the present embodiments may be used in various electronic devices, such as network router devices, televisions, custom telecommunications equipment for special purpose use, etc. The present embodiments are in no way limited to use with the computer system of FIG. 3.

\* \* \*

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a Basic I/O System (BIOS) coupled to the processor, the BIOS having program instructions stored thereon that, upon execution by the processor, cause the IHS to:
identify an encrypted Single-Sign-On (SSO) token and a Trusted Platform Module (TPM) key pair provisioned by an Operating System (OS) and stored in an OS registry;
extract a TPM public key from the TPM key pair;
encrypt a pre-boot authentication (PBA) private key generated by a PBA application with the TPM public key;
store the encrypted PBA private key, the TPM key pair, and the encrypted SSO token in a shadow partition of a self-encrypting hard drive coupled to the IHS;
cause a power cycle of the IHS;
request that a user enter credentials into a logon application, wherein the credentials are the same as would be entered by the user to log onto the OS;
retrieve the PBA private key, the TPM key pair, and the encrypted SSO token from the shadow partition using the credentials;
use the TPM public key from the TPM key pair to decrypt the encrypted PBA private key; and
use the decrypted SSO token to unlock the self-encrypting hard drive.

2. The IHS of claim 1, wherein the program instructions, upon execution, further cause a redirecting of commands issued by the OS and targeting the OS registry to the PBA application.

3. The IHS of claim 1, wherein the power cycle stops electrical power from being provided to the self-encrypting hard drive.

4. The IHS of claim 1, wherein the program instructions, upon execution, further cause the IHS to provide the decrypted SSO token in response to an OS inquiry into the OS registry, and use the decrypted SSO token to log into the OS.

5. A memory device having program instructions stored thereon that, upon execution by a processor of an Information Handling System (IHS), cause the IHS system to:
identify an encrypted Single-Sign-On (SSO) token and a Trusted Platform Module (TPM) key pair provisioned by an Operating System (OS) and stored in an OS registry;
extract a TPM public key from the TPM key pair;
encrypt a pre-boot authentication (PBA) private key generated by a PBA application with the TPM public key;
store the encrypted PBA private key, the TPM key pair, and the encrypted SSO token in a shadow partition of a self-encrypting hard drive;
stop electrical power from being provided to the self-encrypting hard drive;
request that a user enter credentials into a logon application, wherein the credentials are the same as would be entered by the user to log onto the OS;
retrieve the PBA private key, the TPM key pair, and the encrypted SSO token from the shadow partition using the credentials;
use the TPM public key from the TPM key pair to decrypt the encrypted PBA private key;
use the decrypted PBA private key to decrypt the SSO token; and
use the decrypted SSO token to unlock the self-encrypting hard drive.

6. The memory device of claim 5, wherein the program instructions, upon execution, further cause the IHS to provide the decrypted SSO token in response to an OS inquiry into the OS registry, and use the decrypted SSO token to log into the OS.

7. A method, comprising:
identifying an encrypted Single-Sign-On (SSO) token and a Trusted Platform Module (TPM) key pair provisioned by an Operating System (OS) and stored in an OS registry;
extracting a TPM public key from the TPM key pair;
encrypting a pre-boot authentication (PBA) private key generated by a PBA application with the TPM public key;
storing the encrypted PBA private key, the TPM key pair, and the encrypted SSO token in a shadow partition of a self-encrypting hard drive;
stopping electrical power from being provided to the self-encrypting hard drive;
requesting that a user enter credentials into a logon application;
retrieving the PBA private key, the TPM key pair, and the encrypted SSO token from the shadow partition using the credentials;
using the TPM public key from the TPM key pair to decrypt the encrypted PBA private key;
using the decrypted PBA private key to decrypt the SSO token;
using the decrypted SSO token to unlock the self-encrypting hard drive; and
using the decrypted SSO token to log into the OS.

* * * * *